United States Patent [19]

Lee

[11] Patent Number: 4,673,914
[45] Date of Patent: Jun. 16, 1987

[54] KEYLESS AUTOMOBILE DOOR LOCK/UNLOCK, IGNITION SWITCHING AND BURGLAR ALARM SYSTEM

[76] Inventor: Ki-Chang Lee, 125-6 Jongam-dong, Sungbuk-ku, Seoul 132, Rep. of Korea

[21] Appl. No.: 591,507

[22] Filed: Mar. 20, 1984

[51] Int. Cl.$^4$ .............................................. B60R 25/04
[52] U.S. Cl. ..................................... 340/64; 180/287; 307/10 AT; 361/172
[58] Field of Search ............... 340/543, 64, 63, 365 R, 340/825.31, 825.32, 542, 825.75; 180/315, 336, 287, 289; 70/286, 257, 264, 278; 307/10 AT; 361/171, 172; 123/179 BG, 198 B

[56] References Cited

U.S. PATENT DOCUMENTS

| | | | |
|---|---|---|---|
| 3,344,629 | 10/1967 | Burney | 340/542 X |
| 3,525,414 | 8/1970 | Copelan | 180/289 |
| 3,611,287 | 10/1971 | Hoff et al. | 180/289 X |
| 3,691,396 | 9/1972 | Hinrichs | 340/64 X |
| 3,714,628 | 1/1973 | Sloger | 340/64 |
| 3,723,967 | 3/1973 | Atkins et al. | 180/289 X |
| 3,735,833 | 5/1973 | Sutkowski | 180/289 |
| 3,778,770 | 12/1973 | Hagendoorn et al. | 340/825.32 |
| 3,803,551 | 4/1974 | Jordan | 180/287 X |
| 3,820,361 | 6/1974 | Leitner | 180/289 X |
| 3,866,168 | 2/1975 | McGuirk, Jr. | 340/64 |
| 3,926,021 | 12/1975 | Genest et al. | 70/278 |
| 4,090,175 | 5/1978 | Hart | 340/543 X |
| 4,157,478 | 6/1979 | Quinton | 307/10 AT |
| 4,205,325 | 5/1980 | Haygood et al. | 361/172 X |
| 4,233,642 | 11/1980 | Ellsberg | 361/172 |
| 4,240,516 | 12/1980 | Henderson et al. | 340/63 X |
| 4,274,080 | 6/1981 | Brunken | 340/64 X |
| 4,280,119 | 7/1981 | May | 340/543 X |
| 4,320,382 | 3/1982 | Roucek | 340/64 |
| 4,327,353 | 4/1982 | Beard et al. | 180/287 X |
| 4,371,052 | 2/1983 | Brandt | 307/10 AT X |
| 4,438,752 | 3/1984 | Cheung | 307/10 AT X |
| 4,446,380 | 5/1984 | Moriya et al. | 361/172 X |
| 4,463,340 | 7/1984 | Adkins et al. | 307/10 AT X |

Primary Examiner—James L. Rowland
Assistant Examiner—Thomas J. Mullen, Jr.
Attorney, Agent, or Firm—Peter J. Murphy

[57] ABSTRACT

The system is an electric control circuit and associated components including a door locking circuit and an ignition circuit. The ignition circuit is connected to the vehicle battery power through a latch circuit. The latch circuit has alternative "lock" and "unlock" modes for, respectively, connecting battery power to and disconnecting battery power from the ignition circuit. A code sensing circuit provides switching for the latch circuit. This circuit includes means for programming a preselected unlocking code. The code sensing circuit includes code inputting means which might be a push button pad, a barcode reader, an optical binary-code reader, or a magnetic reader; the inputting means being mounted on an entry door of the vehicle. The code sensing circuit includes comparator means for comparing the inputted code to the preprogrammed code for the sending of an unlocking signal to the latch circuit. The control circuit includes an alarm circuit, effective in the "lock" mode of the latch circuit to effect the sounding of the vehicle warning horns when battery power is connected to the motor ignition coil by external means. The ignition circuit includes manual switches for engine starting and stopping and for power to accessories. The locking circuit includes interior switches for selectively locking and unlocking entry doors and the trunk lid.

11 Claims, 13 Drawing Figures

NOTE:
THE LETTERS IN PARENTHESES ARE HEXADECIMAL CODE DESIGNATIONS.

CODING CHART

KEYLESS AUTOMOBILE DOOR LOCK/UNLOCK, IGNITION SWITCHING AND BURGLAR ALARM SYSTEM

BACKGROUND OF THE INVENTION

This invention relates to an automobile door locking-/unlocking, ignition switching-engine starting, and burglar alarm system, which does not require a mechanical key. This system is intended to free a person from the nuisances of (1) carrying an automobile key always, (2) locking himself outside the automobile with the key inside, and (3) sometimes finding his automobile stolen.

For the driver, the system provides convenience and safety of a centralized operation of locking and unlocking doors and trunk while the automobile is parked or being driven.

The system consists of code sensing circuit, locking-/unlocking control logic, solenoid/ignition switching circuit and illogical status detecting alarm circuit. The code sensing circuit recognizes the driver's own password by means of either push-button or optically-coded card; and the locking/unlocking control logic generates, memorizes locking or unlocking signals. The solenoid/ignition switching circuit actually controls the automobile systems; and the illogical status detecting alarm circuit generates burglar warning signals.

The usual automobile uses a mechanical key to lock and unlock doors and to turn on and off the electric power to accessory apparatus, ignition coils and starting motor. Therefore, the driver must always carry the key with him or her. In modern busy life, carrying a key is sometimes troublesome for people. Everyone will be delighted if he can be free from carrying a key, so that he is forever free from the agony of losing the key.

Furthermore, one can't easily avoid the difficult situation of locking doors with the key left inside of the automobile. Also the mechanical key is vulnerable to burglars who can open doors by similar keys. Most automobile losses are because of this reason; and this is not only a property loss for individuals involved, but also results in crime increase which is now becoming a serious social problem.

The main object of this invention is to do away with this key. When this invention is employed, instead of a key, a push button pad or driver's license or some other card with a barcode or optical code on the back side of it is used.

When the driver, from the outside of an auto, pushes a certai combination of numbers on the push button pad or passes an opticalcode card through a sensor, the digital circuitry identifies this code and compares it to the preset code in the instrument. When the two codes match with each other, the unlocking pulse is generated which drives the switching transistor and in turn, energizes front door solenoids toward door unlocking position. At the same time, the unlocking pulse is stored in the latch (memory) circuit for an unlocking status and it enables the car battery voltage to be applied to automobile electric systems including the ignition coil and starting motor by the use of power switch.

When the locking button (one to four buttons could be pressed simultaneously to lock all doors) is pressed, the locking pulse drives a switching transistor and energizes all door solenoids toward door locking position. Thereafter, the latch circuit is memorized as locking status; and in this status, no battery power is applied either to the electric system or ignition and starting motor. Nobody can then open a door and get in the automobile.

Even if one gets in the auto in some irregular way, he is unable to turn on the power switch unless he knows the code. Thus, it is impossible for him or her to drive the car, since the locking status of the latch circuit cuts off the battery power line.

There are also an internal door lock/unlock switch and a trunk open switch on the front panel of the auto; and these switches can be conveniently used for locking and unlocking of all doors as well as opening trunk from the front seats. Although these features are not new for many existing expensive cars, it is an advantage of this system to enable these two functions simultaneously.

Either a rotary switch or a push button could be used for the main power switch which replaces the regular key-operated ignition switch. In case of rotary switch option, there are five switching positions, LOCK-OFF-ACCESSORY ON-RUN-START. If one rotates the power rotary switch to "lock" position, the system will be reset to lock status which disables battery power switching without locking doors. On the other hand, in case of push button option, there are two buttons and a switch. One button is the power button which provides the battery power switching status: OFF→ACCESSORY ON→RUN→ACCESSORY ON→OFF (repeated in the same order) as the button is pushed repeatedly. There is separate "start" switch, which turns the starting motor on and off when the POWER button is in the RUN status. The "lock" button shuts off the power switching without locking doors.

By the functions described up to now, this system could protect against almost all automobile thefts. However, if the thief is a very electrically-intellectual person who knows automobile electrical systems well, he will disconnect this system wiring and connect a wire from the auto battery terminal directly to the ignition circuit, and also jumpers to the starting motor to fire the engine. This rare possibility could also be prohibited by the burglar alarm circuit, which turns electric horns on and off if any power voltage is applied to the ignition coil during the locking status of the latch circuit.

The pass number (cipher combination) reading device can be either a four push button set, or a magnetic code or optical code reader, installed in left and right front doors. When a magnetic or bar code reader is used, a magnetic tape or optical code label which is coded to a specific pass number should be attached to the back side of a drivers license, or of other card like commercial credit card. This will also prevent drivers from travelling without a driver's license. When using four hexadecimal digits, as in the example schematic diagram, the system has 65535 ($16 \times 16 \times 16 \times 16 - 1$) combinations for coding.

SUMMARY OF THE INVENTION

The objects of the invention are accomplished in a locking and power system for a vehicle which includes a door locking circuit and an ignition circuit. A latch circuit couples the ignition circuit to the vehicle battery power; and this latch circuit has alternative "unlock" and "lock" modes or conditions for, respectively, connecting the ignition circuit to battery power, and disconnecting that circuit from battery power. A code sensing circuit is provided for producing a locking signal and unlocking signal; and the code sensing circuit is coupled to the latch circuit to enable the shifting of the latch circuit between the "lock" and "unlock" modes.

More particularly the code sensing circuit includes code inputting means mounted on the exterior of the vehicle which night be a push button pad, a barcode reader for accommodating a card bearing a barcode, an optical reader for reading an optical binary-coded card including means for accommodating the card, or a magnetic reader including means for accommodating a magnetic coded card.

Still more particularly the system may include an alarm circuit including the vehicle warning horn, which alarm circuit has means for energizing the warning horns when the vehicle mctor ignition coil is connected to battery power by external means during the lock mode.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1:
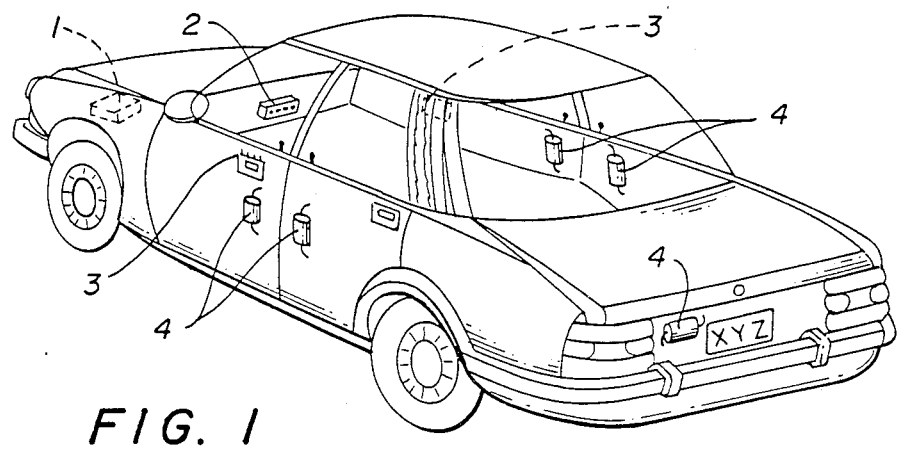
FIG. 1 is a perspective view of an automobile illustrating diagrammatically some components of a system according to the invention.

Referring now in more detail to the drawing, in which like numerals indicate like parts throughout the several views, FIG. 1 illustrates the automobile equipped with the keyless automobile control system, which consists of the main unit 1, a dashboard control unit 2, the keyless access apparatus 3 and the solenoid lock assembly 4.

Main unit 1, embracing all electronic circuits, is mounted within the automobile body, and is wired from DC voltage lines of the auto battery and control cables to control unit 2, keyless access apparatus 3 and solenoids 4. Control unit 2 consists of several switches, buttons, and LED indicators, operated by the driver.

Figure 2:
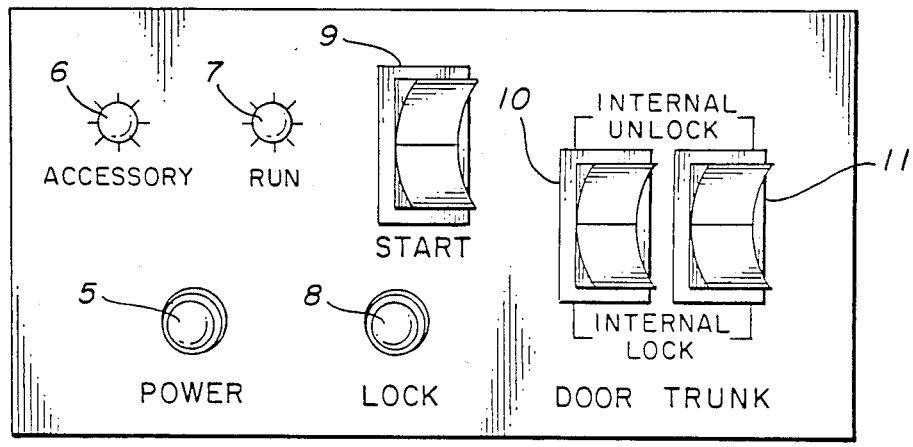
FIG. 2 is a detail view of a dashboard control panel, employing push button switches for ignition switching.
Figure 3:
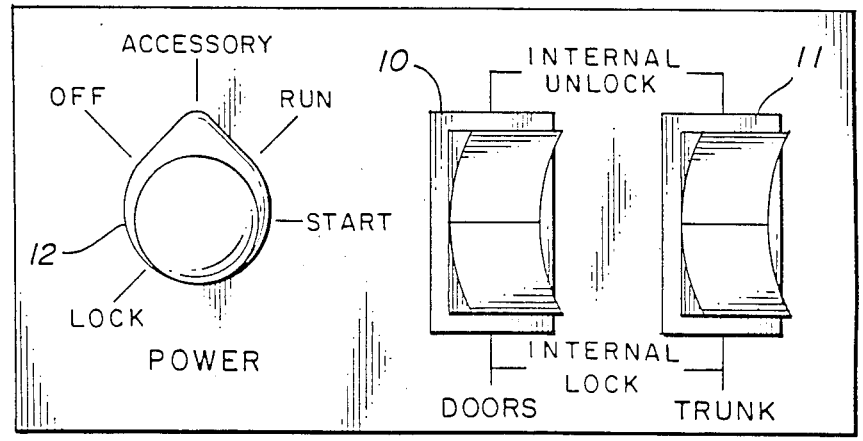
FIG. 3 is a detail view of a dashboard control panel, employing a rotary switch for ignition switching.
Figure 4:
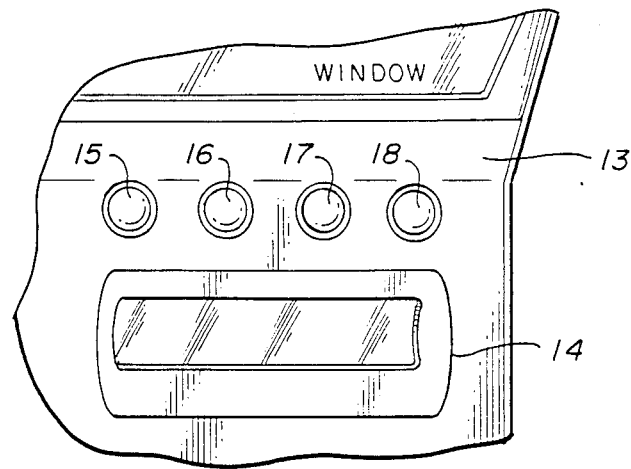
FIG. 4 is a detail view of external access apparatus employing push buttons.
Figure 5:
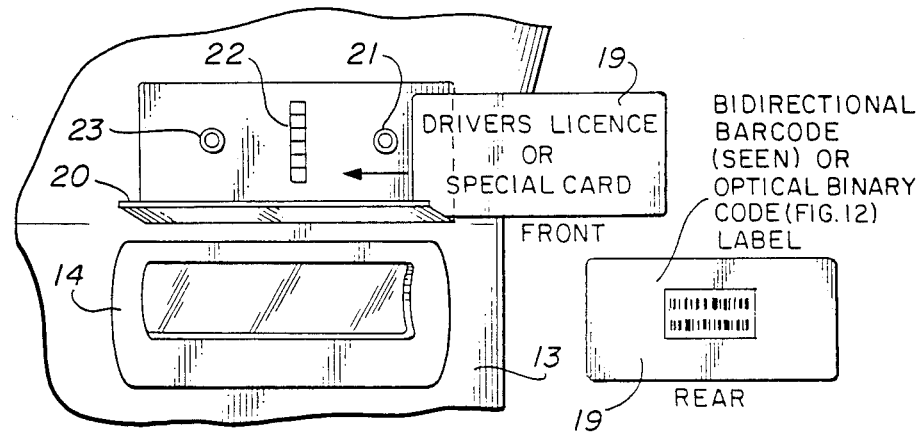
FIG. 5 is a detail view of external access apparatus employing an optical code reader.

FIGS. 2 and 3 show two optional forms form of control unit which are to be described later. Access apparatus 3 is a externally accessible part to lock or unlock doors instead of a regular key. This apparatus could be push-button pads, optical code readers or magnetic code readers; and is mounted near the handles of the front doors. FIG. 4 and FIG. 5 illustrate the constructions of push-button type access apparatus and optical code reader type access apparatus respectively. Solenoid drive assembly 4 is a mechanism which actually drives door locking/unlocking lever, is mounted on four doors and a trunk door; and a detailed illustration appears in FIG. 6.

FIG. 2 shows a push-button power switch type control unit 2. Power button 5 is replacing the conventional key ignition switch, and switches to the following states successively when it is pushed repeatedly: OFF-ACCESSORY ON - IGNITION ON (RUN)-ACCESSORY ON - OFF. LED indicators 6 and 7 indicate the present status of power button 5; that is, no light on means OFF state, accessory power indicator 6 light on means ACCESSORY ON state, and accessory power indicator 6 plus ignition power indicator 7 both light on means RUN state. In RUN state, pushing the START button 9 starts the engine. The three position see-saw switches 10 and 11 are used to lock or unlock all doors and the trunk door respectively.

FIG. 3 shows a rotary power switch type control unit 2. Power switch 12 is just like the regular ignition switch except not key-operated. Main unit 1, in FIG. 1, turns the main battery power on and consequently energizes power switch 12 for normal operation when access apparatus 3 in FIG. 1 is correctly coded. Internal doors lock/unlock switch 10 and internal trunk lock/unlock switch 11 are the same as in FIG. 2.

FIG. 4 is a push-button type keyless access apparatus using four push-buttons 15, 16, 17 and 18 which are for the units of thousands, hundreds, tens and ones, respectively. Push buttons are mounted near the handle 14 of the two front doors 13 for convenience. These push-buttons are to be pushed a preset number of times to unlock the doors and activate the automobile electrical systems; while two or three of the buttons are to be pushed simultaneously for locking all doors and deactivating the automobile electrical systems.

FIG. 5 is an optical code reader type keyless access apparatus The optical code reader assembly, consisting of scanning start switch 21, reflective object sensor 22, locking switch 23 and card guide rail 20, is mounted near handle 14 of a front door 13. A driver's license or a special card 19, with specific optical code label attached on the back side should be passed over the reflective object sensor 22 to unlock the doors, and activate the electrical system. On the other hand, the locking switch 23 should be pushed to lock the doors and shut off the electric system.

Figure 6:
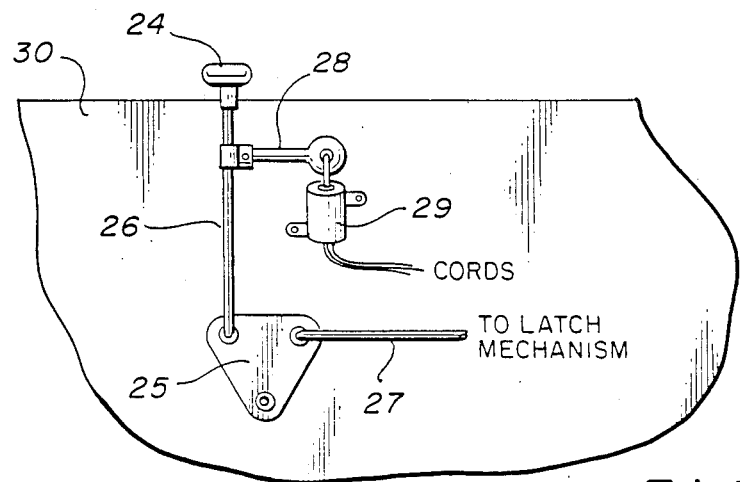
FIG. 6 is a fragmentary detail view of a solenoid operated door lock mechanism.

FIG. 6 shows an internal structure of solenoid drive mechanism inside each door. Lock button 24, gyration lever 25 and moving rod 26, 27 are components of a conventional door locking/unlocking mechanism. Coupling 28 and solenoid 29 are additionally mounted on door frame 30 to retro-modify for the keyless automobile control system.

Figure 7:
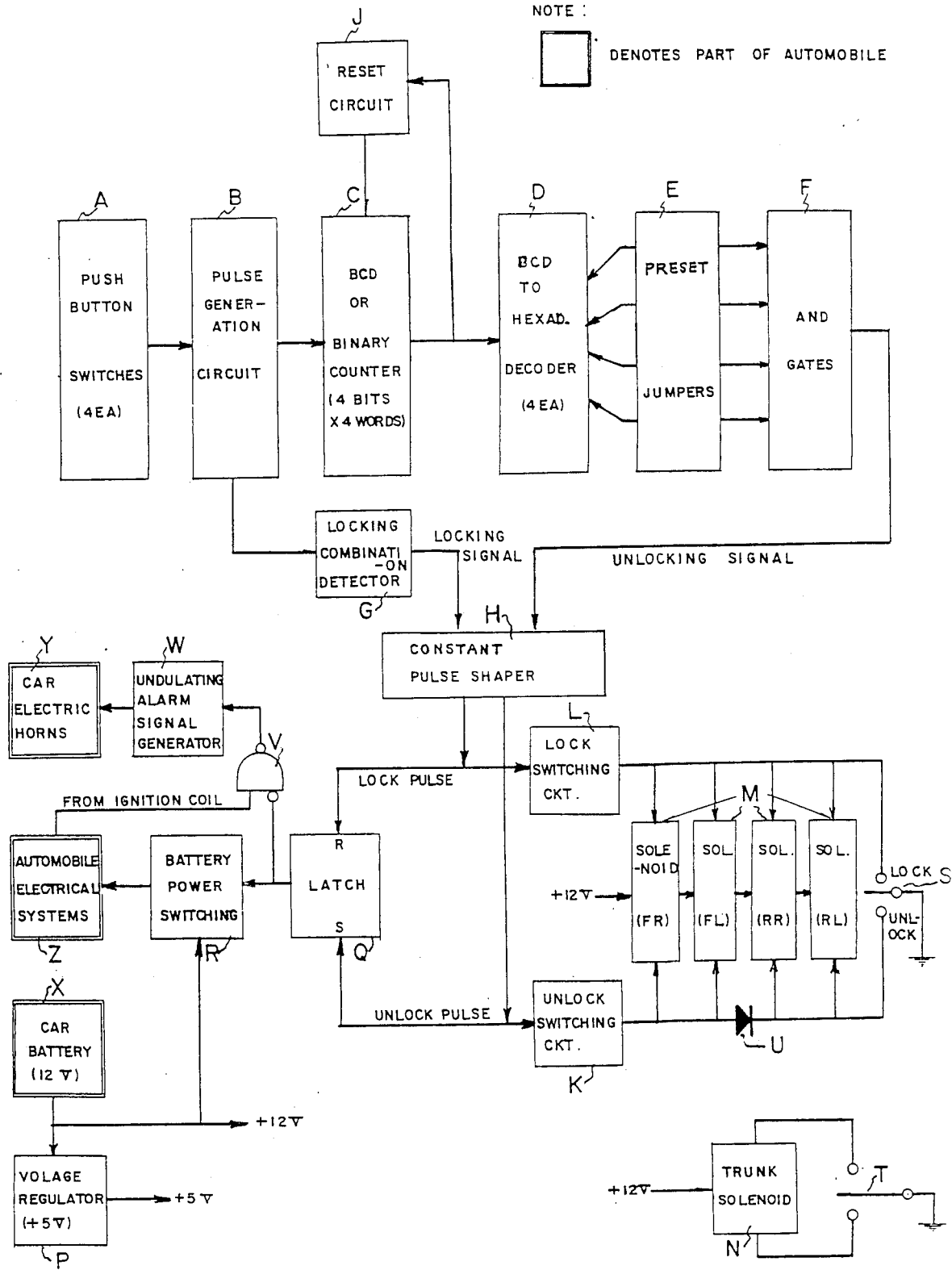
FIG. 7 is a block diagram of a system according to the invention employing push-button access apparatus.

FIG. 7 is a functional block diagram of push button type keyless automobile control system. Detailed explanation follows. A is the external access apparatus which includes four push-buttons, which are to be pushed down in a secret code sequence pattern. Let's say the password is 1-2-3-4, then the first button will be pushed down one time, the second button two times, the third button three times and fourth button four times. Pulse generation circuit B shapes constant width digital pulses of which the number is the same as the number of button push-downs, which pulses pass to BCD counter C where the four pulse trains are transformed to four 4 bit BCD codes. The 4 bit BCD codes are directly connected to 4 to 16 BCD-to Hexadecial decoder D; and one of the 16 decoder output terminals are jumped through jumper cables E to one of four AND gates F input terminals as a preselected password. When the four number password of button push-downs from A is consistent with the preselected password, a high logic unlocking signal will be transmitted from AND gate F.

The unlocking pulse signal is shaped in constant width form in pulse shaper H and fed to unlocking switching circuit K to unlock the two front doors by activating front-right (FR) and front-left (FL) solenoids M into the unlocking state. Diode U protects the two rear solenoids M (RR and RL) from unlocking automatically because it is not usually necessary.

On the other hand, if two or three specially designated buttons (out of 4 push buttons A) are pushed down simultaneously, this special combination is detected in locking combination detector G, and is regarded as a locking pulse signal which is shaped in constant width form in pulse shaper H. This locking pulse drives the locking switching circuit L, and locks-up all four doors by energizing all four solenoids M into the locking state.

Reset circuit J detects the first pulse from the BCD counter C output terminal, and after a delay time approximately 10 to 15 seconds resets all BCD counters to zero setting, to accept the next push-button operation.

As illustrated in the block diagram, the unlocking and lock pulses also sets and resets the latch circuit Q, respectively, which means either the latest locking or unlocking status will be memorized; and latch circuit Q controls battery power switching circuit R. In unlocking status, automobile battery voltage could be supplied from auto battery X to any auto electrical systems Z including accessories, lights, ignition coil, starting motor, etc. by the button switch 5 in FIG. 2, or rotary switch 12 in FIG. 3. On the other hand in the locking status of latch circuit Q, battery power switching circuit R shuts off the battery power voltage to auto electrical system Z, thus normal driving is impossible unless entering into the auto by pushing correct password.

In the locking status, the output level of latch circuit Q is logically "low"; and of course there should be no voltage on ignition coil. However, supposing an auto thief attempted to connect auto battery voltage to ignition coil so as to drive the auto away, the differential input NAND logic gate V would send a gating pulse to undulating alarm generator W, which would turn auto electric horns Y on and off continuously. This is an alert signal to inhibit even the intelligent auto thieves. Voltage regulator P drops the car battery voltage to 5 volts for all of the system circuitry.

Additionally, an internal door lock-unlock switch S (10 in FIG. 2 and FIG. 3) is provided for the driver's convenient door locking and unlocking from the front seat, regardless of auto electrical system power switching circuit R and latch circuit Q interruptions. Trunk door lock-unlock switch T in FIG. 7, (11 in FIG. 2 and FIG. 3) is also provided for convenience, and is completely independent of latch circuit interruptions.

Figure 8:
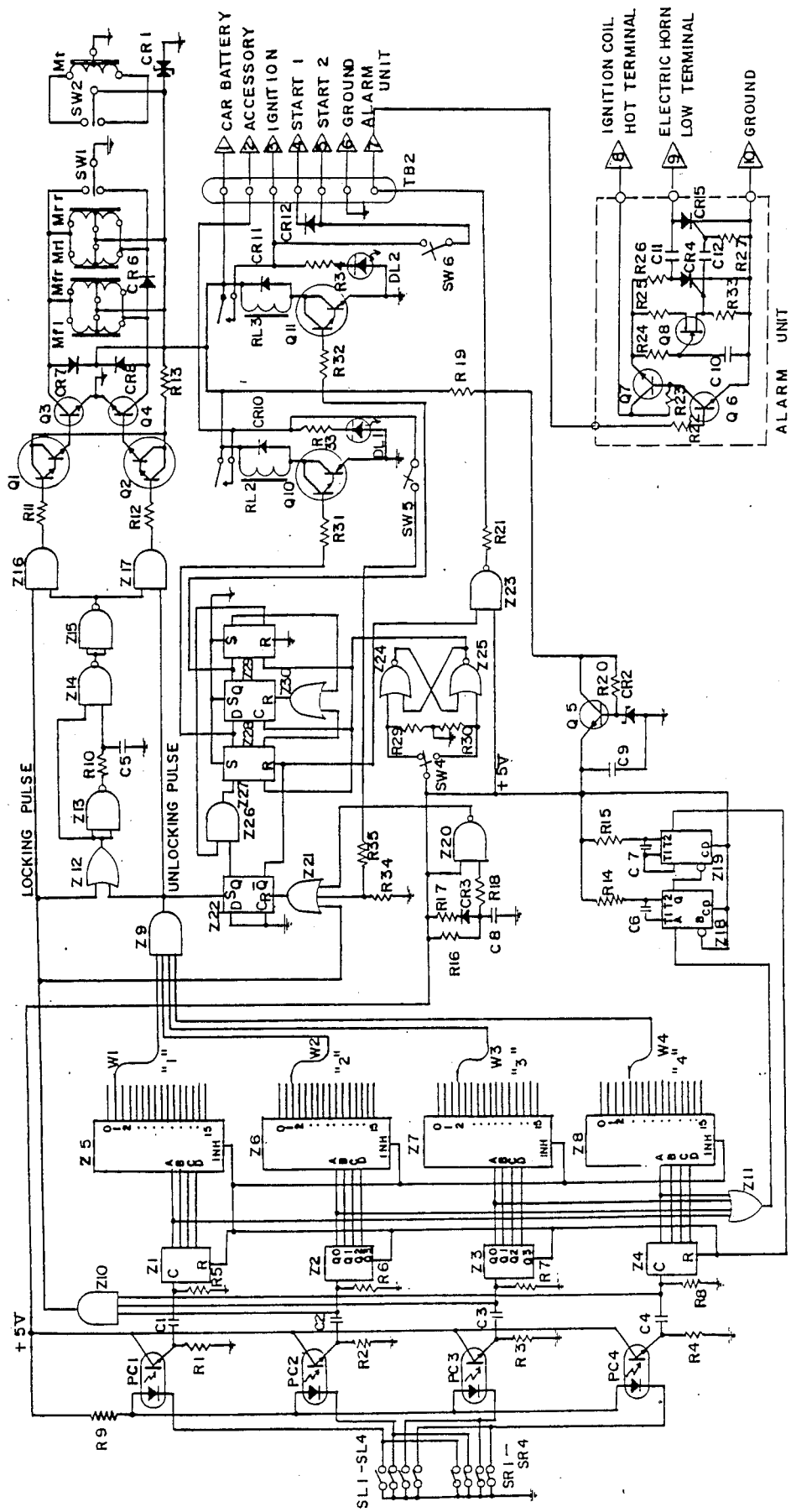
FIG. 8 is a schematic circuit diagram of a system according to the invention' utilizing a push-button ignition switching system.

Now referring to FIG. 8 overall schematic diagram, SL1 through SL4 and SR1 through SR4 are the two sets of four push-button switches, located on the left-front and on the right-front automobile doors respectively. The two push-button sets are parallelized - either one can be accessed at any time - and ground the cathodes of light emitting diodes of photo coupler PC1 through PC4, which cause the collector and emitter of photo transistors to short out and supply +5V to the junctions of R1-C1, R2-C2, R3-C3 and R4-C4. C1-R5, C2-R6, C3-R7 and C4-R8 act as a differential circuit, converting the emitter voltages to constact width pulses which are to be counted in binary counters Z1 through Z4 through the input count terminals. As the push-buttons are keyed several times, the appropriate binary codes appear at the output terminals Q0, Q1, Q2 and Q3 and are directly entered into respective 4-to-16 binary decoders Z5 through Z8, through input terminals A, B, C, D. The 16 output terminals of the 4-to-16 binary decoders are normally logic "low", except the selected numbered terminal which is logic "high". A password consisting of four hexadecimal (or only decimal code may be used) digits are preset by connecting jumper wires W1 through W4 to the proper terminals 0, 1 . . . 15 of decoders Z5 through Z8. When the preselected password coincides with the number combination keyed by the push-button sets SL1 through SL4 or SR1 through SR4, four inputs of AND gate Z9 will be "high", and an unlocking pulse signal will appear at the output of AND gate Z9.

On the other hand, if the three buttons SL2, SL3, SL4 or SR2, SR3, SR4 are pushed down simultaneously, this causes the three input terminals of AND gate Z10 to be "high"; and therefore a locking pulse signal appears at the output of gate Z10.

The constant width pulse shaper circuit comprised of an OR gate Z12, three NAND gates Z13, Z14 and Z15, and integrating circuit R10-C5 transforms unregulated locking or unlocking pulse width to a constant pulse at the output terminal of NAND gate Z15. Either locking or unlocking pulse which has comparatively long width drives "high" inputs to NAND gate Z13 and one input of NAND gate Z14. The output terminal Z13 is normally "high" so that capacitor C5 is fully charged through resistor R10 to "high". When a locking or unlocking pulse is generated, the same pulse is applied to one input terminal of Z14 and to the other is applied the decaying pulse at the rate of time constant $R10 \times C5$ because the voltage of capacitor C5 is discharged to the "low" output terminal of Z13, through resistor R10. Thus, a constant reduced width negative pulse is coupled from Z14 output to Z15 input, which is inverted by NAND gate Z15 and goes to one input terminal each of AND gates Z16 and Z17. Gates Z16 and Z17 separate locking or unlocking operation by ANDing constant width pulse output of Z15 and original locking or unlocking pulse from Z10 or Z9 respectively.

Now the locking pulse is applied through resistor R11 to darlington transistor Q1 and triggers the switching transistor Q3. Thus, front door solenoids Mfl (left door solenoid) and Mfr (right door solenoid) and rear door solenoids (Mrl (left door solenoid) and M̈rr (right door solenoid) lock all doors because +12 v. battery current flows from the center taps of solenoids through the upper half (door locking) windings to collector and emitter of Q3 and finally to the ground.

In the same way, the unlocking pulse is applied through resistor R12 to the base of darlington transistor Q2 and triggers switching transistor Q4 which unlocks front door solenoids Mfl and Mfr by enabling the +12 v. battery current to flow through lower half windings of Mfl and Mfr from the center tap to the collector-emitter of transistor Q4. Diode CR6 blocks this current from flowing to rear door solenoids Mrl and Mrr, because it is usually necessary to open front doors only. However, all of the front and rear doors may be locked or unlocked by means of the internal door lock/unlock switch SW1. Diodes CR7 and CR8 are provided to protect switching transistors Q3 and Q4 from being destroyed by the reverse induction voltage of solenoids.

Over-voltage protection diode CR1 suppresses transient high voltages from the automobile electrical system. Solenoid Mt effects trunk locking and unlocking; and internal trunk lock/unlock switch SW2 activates truck solenoid Mt.

The unlocking and locking signal from gates Z9 and Z10 are also applied to type D flip-flop Z22, which is set directly or is reset through OR gate Z21. With inputs D and C grounded, flip-flop Z22 acts as a latch memorizing the latest status, locking or unlocking. In unlocking status, output Q of Z22 is "high"; and in locking status output $\bar{Q}$ is "high".

The circuitry consisting of three type D flip flops Z27, Z28, Z29, AND gate Z26, and OR gate Z30 functions as a simulated auto ignition power step switching circuit. Power button SW4 switches +5 V. to inputs of the latch circuit consisting of NOR gates Z24 an Z25 and resistors R29 and R30, and supplies chattering-free clock pulses to input terminals C of the three flip-flops Z27 through Z29. Output terminal Q of Z27 turns the automobile accessory equipment on and off; and output Q of Z28 controls the power switching of automobile ignition voltage. Considering unlocking status first, flip-flop Z22 is set and "high" logic level appears on output Q of Z22 and at one input of AND gate Z26. The other input terminal of gate Z26 is also "high", because initially there was no "high" input on terminal D of flip-flop Z29 which mean output $\bar{Q}$ of Z29 is "high". Therefore, in unlocking status, input terminal D of flip-flop Z27 stays always "high" logic which is shifted to output terminals Q of Z27, Z28 and Z29 as clock signal is entered to the inputs C of Z27, Z28 and Z29 by pushing SW4. At the first stroke of SW4, output Q of Z27 beccmes "high" which causes the accessory power-on, and at the second stroke of SW4, output Q of Z28 also becomes "high" causing ignition power-on with accessory power still on. If the third clock pulse is generated by SW4 stroke, output terminal Q of Z29 becomes "high" and $\bar{Q}$ of Z29 becomes "low". Consequently, the ignition power becomes off, because the "high" signal of Z29 terminal Q enters the OR input of Z30 and resets Z28, that is the same as in the first stroke status. And if we have fourth SW4 stroke, two output terminals Q of Z27 and Z28 become "low" together because the "low" Z29 $\bar{Q}$ terminal has made the output of Z26 and input D of Z27 "low" state in the prior stroke, and this "low" was shifted at the fourth stroke. Also the inverted output $\bar{Q}$ of Z27 simultaneously becomes "high" and drives OR gate Z30, which consequently resets Z28 Q output to "low". Therefore, the fourth stroke status switches accessory and ignition to power-off; and this is the same as of the original status. From the fifth stroke, it repeats the same conditions continuously. Thus, pushing power button SW4 results in OFF→ACCESSORY ON→IGNITION ON (RUN)→ACCESSORY ON→OFF→ (Repeats), which is a simulated auto ignition power switch step operation.

Closing start switch SW6 energizes the starting motor in the IGNITION ON (RUN) status, and pushing lock button SW5 shuts off all power to the electrical system, by resetting flip-flop Z22 through the second input of OR gate Z21. In locking status, the "high" logic level of output terminal $\bar{Q}$ of flip-flop Z22 appears at reset terminal R of flip-flop Z27 to reset flip flop Z27; and once again the "high" output $\bar{Q}$ of Z27 is coupled to OR gate Z30 and resets Z28 too, thus shutting off all power to the accessory and ignition system of the automobile. The circuit consisting of NAND gate Z20, resistors R16 through R18, capacitor C8 and diode CR3 is a power-on-reset circuit which assures locking status whenever system power is connected or disconnected. A reset pulse will be generated on the output of gate Z20 because one input is immediate voltage; and the other input of gate Z20 is a delayed (slowly growing) input voltage, owing to the charging time of C8 when system power is just applied.

The accessory power switching signal from the output Q of flip-flop Z27 is coupled through current limiting resistor R31 to darlington switching transistor Q10 which controls relay RL2. The dc battery voltage from terminal 1 of terminal board TB2 is connected through the contacts of relay RL2 to the accessory power terminal 2 of board TB2 which is connected to electrical systems such as radio, lights, etc. Indicator lamp DL1 will light when accessory power is turned on. In the very similar way, ignition power switching is performed by resistor R32, darlington transistor Q11, relay RL3 and its contacts. Lamp DL2 is an ignition power-on indicator; and diodes CR10 and CR11 are relay reverse voltage absorbers. Resistors R33 and R34 are current limiting resistors to LED lamps DL1 and DL2 respectively.

The circuit comprising of monostable multivibrators Z18 and Z19, resistors R14 and R15 and capacitors C6 and C7 is a timer to reset counters Z1 through Z4 and binary decoders Z5 through Z8 after a certain amount of time (e.g. 10 to 15 seconds) following the first stroke of push buttons SL1 through SL4 or SR1 through SR4. Pushing any button will result in a "low" to "high" change in the four Qo outputs of the binary counters Z1 through Z4; and this logic change will be detected at the "high" output of OR gate Z11, which triggers input A of monostable multivibrator Z18. Output Q pulse of Z18 is delayed for a time determined by time constant of R14 and C6, and is applied to the inverted input terminal B of monostable multivibrator Z19; and the final reset pulse provided at the output terminal Q of multivibrator Z19 is transmitted to reset terminals R of counters Z1 through Z4 and inhibit terminals INH or decoders Z5 through Z8. The reset pulse width is determined by the time constant of R15 and C7.

The circuit consisting of transistor Q5, resistor R19 and R20, capacitor C9 and zener diode CR2 is popular series voltage regulator which drops the +12 V from battery to +5 V for the system's operating voltage.

Finally, the circuitry enclosed within the broken line is an burgler alarm unit which may be mounted in the automobile separately from the main unit. When a locking pulse applied to input of gate Z21, flip-flop Z22 is reset and the "high" $\bar{Q}$ output is applied to the input of NAND gate Z23. The "low" output of gate Z23 is applied through circuit protection resistors R21 and R22 to the base of transistor Q6 and shorts the collector-emitter junction of alarm circuit voltage switching transistor Q7. In the locking status, there should be no voltage at the ignition coil hot terminal 8 and therefore the alarm circuit cannot function. However, if any auto thief attempts to start the auto by connecting an external battery wire to the ignition coil during the locking status, ignition coil voltage will be supplied through transistor Q7 to resistors R24, R25 and R26. Junction FET Q8, resistors R24, R25 and R33, and capacitor C10 forms a J FET oscillator circuit of which the frequency is dependent on the charging and discharging rate of capacitor C10. The silicon-controlled-rectifier trigger waveform is produced across resistor R33, and it gates CR4 directly and CR5 through capacitor C12 and resistor R27. Automobile electric horns are connected between the battery +12 V terminal and terminal 9 (which is also connected to the manual horn switch). Accordingly these horns will sound an alarm signal as CR5 fires regardless of manual horn switch operation. As soon as CR4 has fired, capacitor C11 is being charged gradually with the CR5 side at positive polarity. Then, CR5 is fired and capacitor C11 is discharged through CR5 and becomes charged with the CR4 side at positive polarity. In this way, CR4 and CR5 fire alternately and as a result, the horns sound intermittently.

Figure 9:
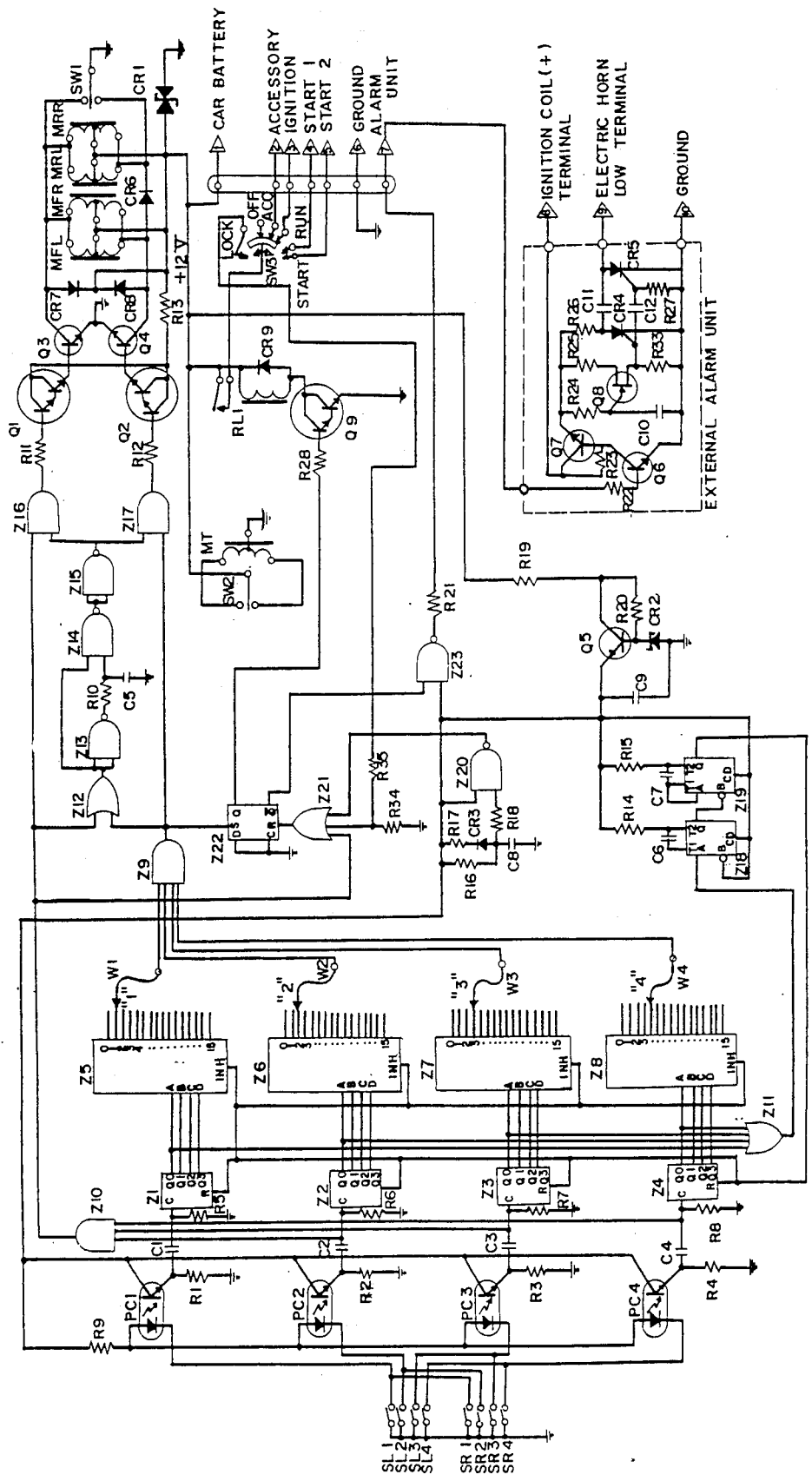
FIG. 9 is a schematic circuit diagram of a system according to the invention utilizing a rotary switch for the ignition switching system.

FIG. 9 is a circuit diagram of another configuration using a power rotary switch SW3, instead of the power button SW4 and its associated circuitry shown in FIG. 8. The "high" unlocking output from Q terminal of flip-flop Z22 is fed through resistor R28 to darlington switching transistor Q9, which activates relay RL1. The contacts of relay RL1 connect the battery to the center pole of power rotary switch SW3. Power rotary switch SW3 is a popular electronic selector switch which has LOCK - OFF - ACCESSORY-RUN-START steps; and the START step is spring loaded. In the unlocking mode, the power rotary switch performs the same functions as a conventional key-operated ignition switch, while in locking mode it does not do anything. Once the power rotary switch is set to LOCK position, +12 V battery voltage is dropped to +5 V by resistor R34 and R35, and this voltage is fed to one input of OR gate Z21, which resets the circuit to locking status. The rest of the functions of the circuit of FIG. 9 are the same as those of FIG. 8, described in detail above.

Figure 10:
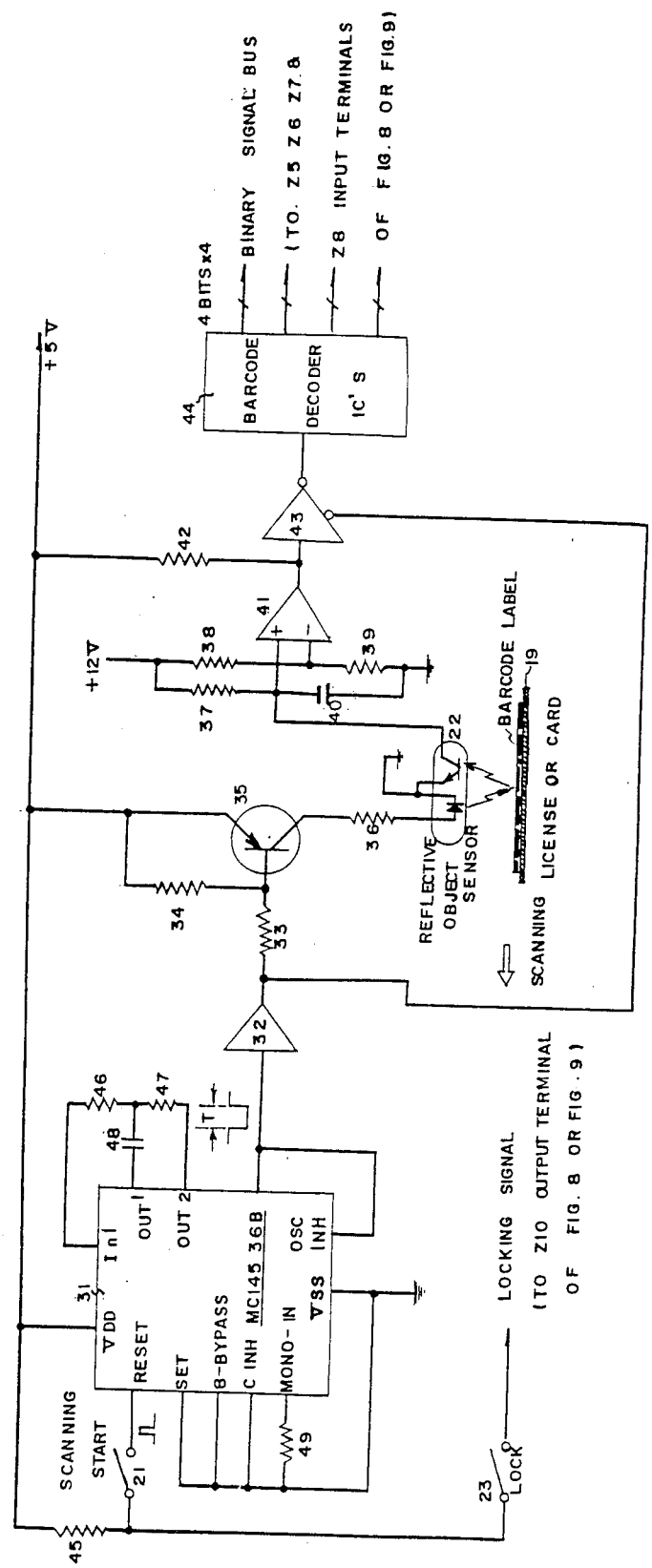
FIG. 10 is a schematic circuit diagram of an optical barcode card reader.

FIG. 10 shows the automobile accessing circuitry using an optical barcode reader system instead of push buttons. FIG. 10 should be considered in conjunction with FIG. 8 or FIG. 9. Switch 21, 22 and 23 are, respectively: (1) a car scanning start button switch; (2) an LED and associated photo transistor of a barcode reader head assembly; and (3) a lock button switch. These same switches are illustrated in FIG. 5. Component 31 is a tier IC, which produces a delayed time pulse after pushing start switch button 21. The pulse is buffered by 32 and gates transistor 35 and inverter 43. During the pulse duration, transistor 35 conducts and turns on the LED in barcode reader 22 through resistor 36. Also the inverter 43 activates and begins to transmit read data to barcode decoder 44, which decodes the barcode to binary signals and send it to the inputs of decoders Z5, Z6, Z7 and Z8, illustrated in FIG. 8 and FIG. 9, during the pulse period. With the barcode reader LED light on it shines on the barcode label, the card with the barcode label 19 will be passed in front of the barcode reader 22 and photo transistor in the barcode reader 22 will read black or white codes which will then be converted to electric signal by operation amplifier 41. The reflected light from the label has different intensities depending whether the reflection is from black or white code. The sensed signal is about 1.2 V for black and about 0.2 V for white at positive input terminal of operational amplifier 41. There is a reference voltage, divided by resistors 38 and 39, which is adjusted that the positive input voltage goes above the negative input voltage of amplifier 41 when the reader is over black. This causes the output terminal of amplifier 41 to go "high" (plus 5 V). For the white code, the positive terminal voltage will be below the negative terminal voltage, and the output terminal of amplifier 41 will be "low" (zero volt). The sensed signal is now buffered and switched by inverter 43 and fed to commercially available barcode decoding circuit 44. The resistor 37 provides proper detector current and the capacitor 40 filters small noises. Resistors 46 and 47 and capacitor 48 determine the delay time of the timer intergrated circuit 31. The lock switch 23 supplies +5 V to the output terminal of AND gate Z10 (in FIG. 8 or FIG. 9) which will produce a locking pulse.

Similarly, a magnetic code reader system can also be used as an access apparatus instead of barcode reader circuit. In this case, a recorded magnetic tape should be attached to the card or license.

Figure 11:
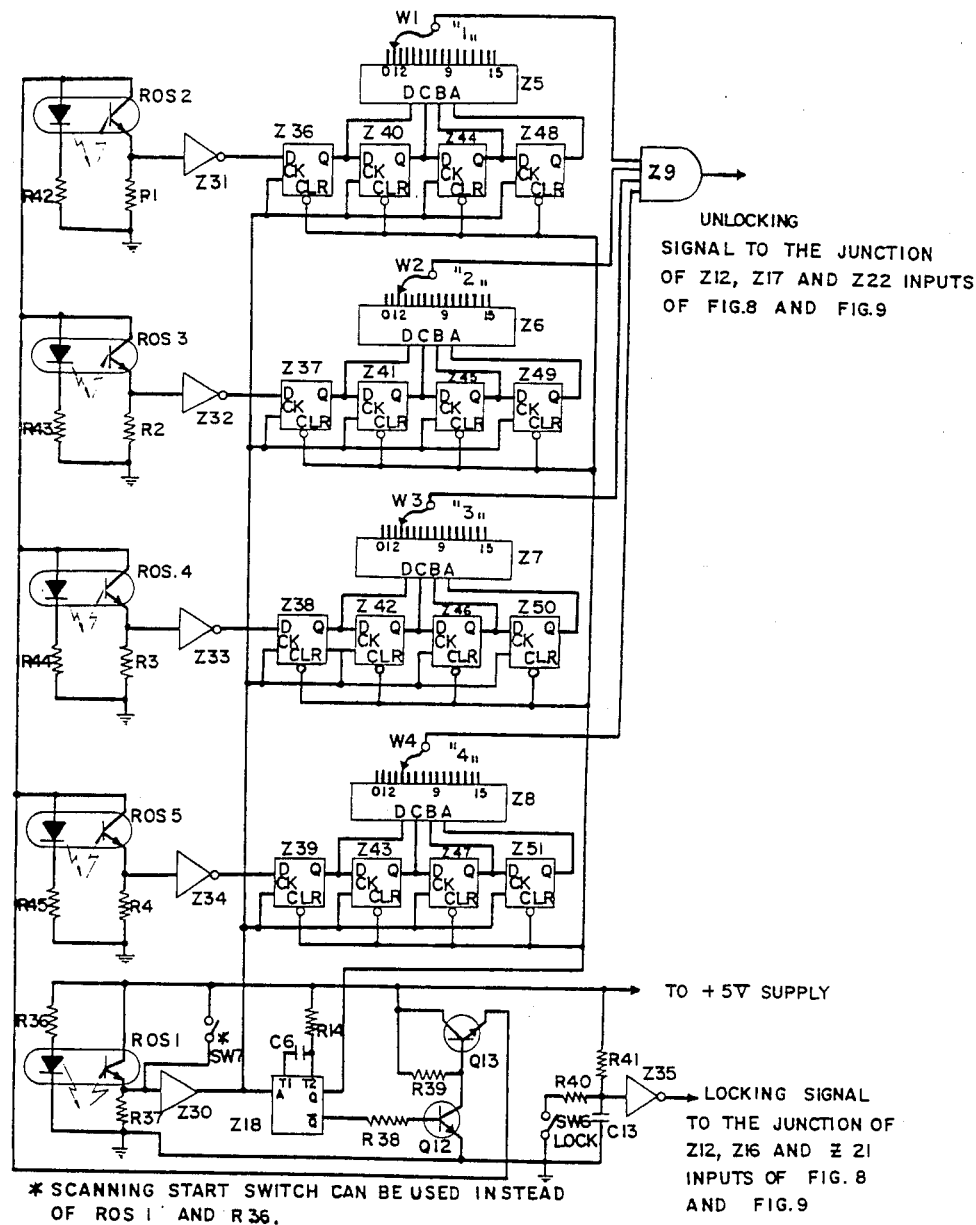
FIG. 11 is a schematic circuit diagram of an optical binary coded card reader.

FIG. 11 is a schematic diagram of another access system for a keyless control system, using an optical binary coded card as a keyless access apparatus; and is to be considered in conjunction with FIG. 8 and FIG. 9. ROS 1 through ROS 5 are reflective object sensors which consist of an infrared emitting diode and a NPN phototransistor mounted side-by-side on converging optical axes in a black plastic housing. The phototransistor responds to radiation from the LED only when a reflective object, which is white part of card, passes within its field of view.

When a card (illustrated in FIG. 12) is passed by, first, the reflective object sensor ROS1 reads the first appearing initialization code and four gating codes which are indicated as white rectangles in row 1 of the card. By the initialization code, ROS1 generates logic "high" signal across the resistor R37, which is then buffered by Z30 and triggers timer IC Z18 which is one-shot monostable multivibrator. Z18 outputs at the terminal Q a positive going time-delayed pulse, whose period is determined by a capacitor C16 and resistor R14; and this pulse enables all 16 of D type flip-flops Z36 through Z51.

The negative time-delayed pulse from terminal $\bar{Q}$ of Z18 turns off transistor Q12 which supplies +5 V to the base of transistor Q13. Therefore, transistor Q13 conducts and supplies the +5 V voltage to the LEDs of ROS 2 through ROS5, which are normally turned off to save current consumption. Next, when reflective object sensors are aligned with the axis of column 1 of the card, ROS2 through ROS5 read the least significant bits of 4 bits codes. The white areas will represent "high" logic level across the resistors R1 through R4, while the black areas represent "low" logic level. This representation is now inverted by inverters Z31 through Z34, and applied to the input terminals D of first type D flip flops Z36, Z37, Z38 and Z39, respectively.

Figure 12:
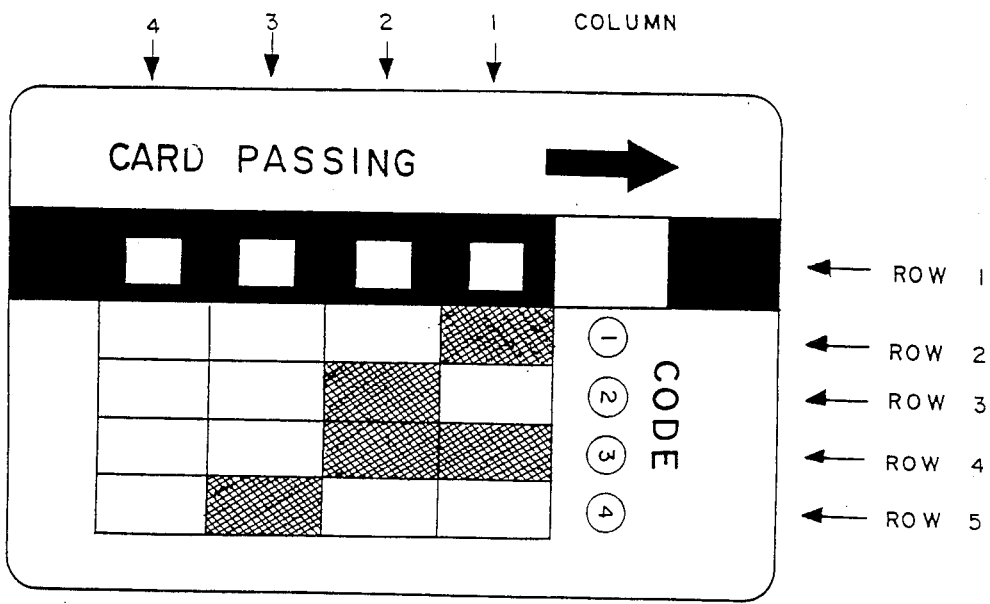
FIG. 12 is a view of an optical binary-coded card which may be used with the system of FIG. 11.

In the middle of each coding column, ROS1 reads a gating pulse represented as a white rectangle in row 1 in FIG. 12, and sends this gating pulse through buffer Z30 to the clock input terminal (CK) of all 16 of flip-flops Z36 through Z51. These flip-flops will then shift their input data to their related output terminals.

The same processes are to be continued for columns 2, 3 and 4 which present the most significant bits as the card passes in the direction of arrow appearing in the card. Consequently, the code of each row of the card is expressed in binary form at the inputs of the 4 to 16 binary decoders Z5, Z6, Z7 and Z8.

As already described in FIG. 8, the jumper wires W1 through W4 are connected onto the appropriate terminals of preset code (n the drawing the preset code is 1-2-3-4). All four inputs of AND gate Z9 become "high" only when the card codings completely agree with the preset code; and the gate Z9 outputs an unlocking signal to input terminals of gates Z12 and Z17 and of flip-flop Z22 in FIG. 8 and FIG. 9.

The locking signal, on the other hand, is generated by pushing button switch SW6 which drops the charge voltage of capacitor C13. With the "low" input of inverter Z35, the output goes up to "high", the locking signal which is applied to the junction of inputs of gates Z12, Z16, flip-flop Z21 flip-flop in FIG. 8 and FIG. 9. The rest of the circuit function is completely the same as in the description of FIG. 8 and FIG. 9. The ROS1 should always be illuminated to detect the card passing at any time, however it can be replaced by a scanning start switch SW7 which is switch 21 of FIG. 5 for the purpose of reducing idle current consumption.

Figure 13:
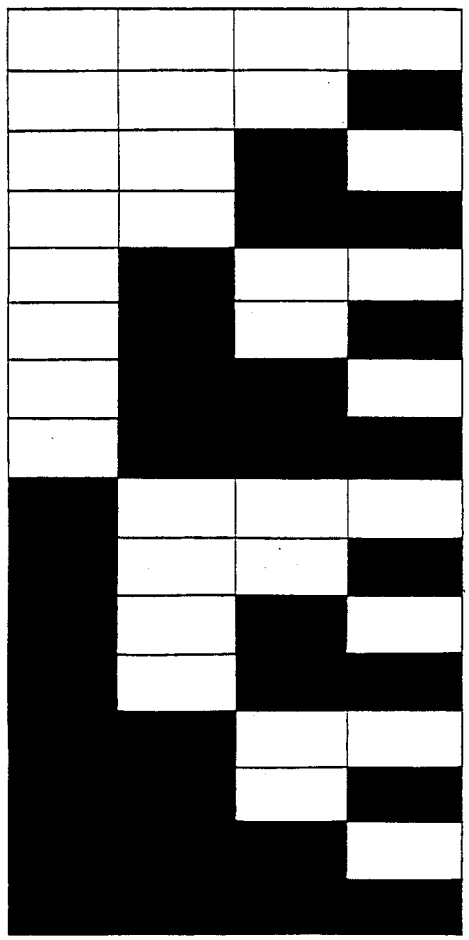
FIG. 13 is a chart illustrating the coding system for use with an optical binary-coded card as illustrated in FIG. 12.

FIG. 12 illustrates the shape of "cross-puzzle type" optical binary-coded card; and FIG. 13 illustrates its binary coding chart which is replacing the barcode system. The file rows of the card of FIG. 12 (row 1 through row 5) are passed in front of the five reflective object sensors; and the codings are read by four sensors on row 2, row 3, row 4 and row 5. Row 1 is used for initialization of the electronic circuits as explained before. The shaded areas in row 2, row 3, row 4 and row 5 are to be black-inked by user to have the user's specific code according to the coding chart. The coding form can either be a sticky label to be put on the rear of driver's license or a PVC cover containing the driver's license or, alternatively, may be a special card like the commercial credit card for example.

The advantages of this invention are to free drivers from carrying keys, to make it more convenient and safe to lock and unlock one's automobile and to make it almost impossible for burglars to steal automobiles. The functions and effects of the invention are as follows:

A. No key to lock or drive the automobile.
1. Releases a person from the inconvenience of carrying a key.
2. Removes the possibility of locking the door with the key inside.
3. Removes the possibility of losing the key.

B. Stealing an automobile is almost impossible.
1. Prevents burglars from stealing auto by using a similar key or a sharp object to subdue lock mechanism.
2. Prevents burglars from driving the auto even when he succeeds in getting in.
3. Sounds an alarm when burglars try to jump battery to starting motor.
4. Preset combination can be changed as needed.

C. Convenience and safety.
1. Centralized locking and unlocking operation of all doors.
2. Prevents children from accidentally opening a door.
3. The trunk can also be opened from the front seat.

4. One step locking of all doors and system electrically when leaving the auto.
5. Both key and electronic code could be used in combination.

The system also can provide use in the combination of both the key and electronic code function.

While the preferred embodiments of the invention have been illustrated and described, it will be understood by those skilled in the art that changes and modifications may be resorted to without departing from the spirit and scope of the invention.

What is claimed is:

1. A keyless locking and power system for a vehicle, comprising
   a door locking circuit and an ignition circuit;
   a code sensing circuit for producing an unlocking signal;
   a latch circuit for connecting said ignition circuit to the vehicle battery power; said latch circuit having alternative "unlock" and "lock" modes for, respectively, connecting said ignition circuit to said battery power, and disconnecting said ignition circuit from said battery power;
   means connecting said code sensing circuit to said door locking circuit to effect the unlocking of vehicle door locks in response to an unlocking signal produced by said code sensing circuit;
   means connecting said code sensing circuit to said latch circuit to effect the shifting of said latch circuit to said "unlock" mode, in response to an unlocking signal produced by said code sensing circuit;
   said code sensing circuit including code sensing input means mounted on the exterior of the vehicle, for inputting a locking or unlocking code; and
   said code sensing input means comprisng at least one push button switch mounted on the exterior of the vehicle, and means for counting the number of closures of each of said push button switches and converting said switch closures to binary codes.

2. A system as set forth in claim 1, including
   said code sensing circuit including means for programming a preselected unlocking code, and comparator means for comparing an inputted unlocking code to said preselected unlocking code to enable the producing of said unlocking signal.

3. A system as set forth in claim 1 including
   said ignition circuit including manual switch means for energizing the vehicle starting motor.

4. A system as set forth in claim 1 including
   said door locking circuit including manual switch means within the vehicle for selectively locking and unlocking entry doors of said vehicle.

5. A system as set forth in claim 1 including
   said latch circuit memorizing the latest "unlock" or "lock" mode thereof.

6. A system as set forth in claim 1 including
   said ignition circuit including manual lock switch means for effecting the shifting of said latch circuit to said "lock" mode, whereby said ignition circuit is then disconnected from vehicle battery power.

7. A system as set forth in claim 6 including
   said door locking circuit including manual switch means within the vehicle for selectively locking and unlocking entry doors of said vehicle independently of the condition of said latch circuit.

8. A system as set forth in claim 1, including said code sensing circuit having means for producing a locking signal in addition to said unlocking signal;

means connecting said code sensing circuit to said door locking circuit to effect the locking and unlocking of vehicle doors in response to respective locking and unlocking signals produced by said code sensing circuit;

means connecting said code sensing circuit to said latch circuit to effect the shifting of said latch circuit between said "lock" and "unlock" modes, in response to respective locking and unlocking signals produced by said code sensing circuit.

9. A keyless locking and power system for a vehicle, comprising a door locking circuit and an ignition circuit;

a code sensing circuit for producing an unlocking signal;

a latch circuit for connecting said ignition circuit to the vehicle battery power; said latch circuit having alternative "unlock" and "lock" modes for, respectively, connecting said ignition circuit to said battery power, and disconnecting said ignition circuit from said battery power;

means connecting said code sensing circuit to said door locking circuit to effect the unlocking of vehicle door locks in response to an unlocking signal produced by said code sensing circuit;

means connecting said code sensing circuit to said latch circuit to effect the shifting of said latch circuit to said "unlock" mode, in response to an unlocking signal produced by said code sensing circuit; and said ignition circuit including manual switch means for switching sequentially between "off", "accessory on", and "run-start" conditions; said ignition circuit further including a manual start switch for connecting the vehicle battery to the vehicle starting motor.

10. A system as set forth in claim 9 including alarm circuit means including a warning horn circuit of said vehicle; said alarm circuit means including means energizing said vehicle warning horn when the ignition coil of said vehicle is connected to battery power by external conductor means, when said latch circuit is in said "lock" mode.

11. A system as set forth in claim 9 including said manual switch means including a push button type simulated key-operated power switch comprising a push button switch, digital circuits and switching transistors to switch between said "off", "accessory on" and "run-start" conditions.

* * * * *

UNITED STATES PATENT AND TRADEMARK OFFICE
CERTIFICATE OF CORRECTION

PATENT NO.  : 4,673,914
DATED       : June 16, 1987
INVENTOR(S) : Ki-Chang Lee

It is certified that error appears in the above-identified patent and that said Letters Patent is hereby corrected as shown below:

| | |
|---|---|
| Column 1, line 50  | "certai" should read --certain--; |
| Column 4, line 47  | "apparatus" should read --apparatus.--; |
| Column 6, line 12  | "contact" should read --constant--; |
| Column 7, line 47  | "beccmes" should read --becomes--; |
| Column 9, line 36  | "CFF" should read --OFF--; |
| Column 9, line 56  | "tier" should read --timer--; |
| Column 11, line 11 | "n" should read --in--; |
| Column 11, line 32 | "file" should read --five--; |

Signed and Sealed this

Twenty-fourth Day of November, 1987

Attest:

DONALD J. QUIGG

*Attesting Officer*　　　*Commissioner of Patents and Trademarks*